(12) United States Patent
Sakai et al.

(10) Patent No.: US 6,453,113 B1
(45) Date of Patent: Sep. 17, 2002

(54) EDITING APPARATUS AND EDITING METHOD

(75) Inventors: Seiichi Sakai, Tokyo; Hideki Ando; Norihiko Noguchi, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/181,189

(22) Filed: Oct. 28, 1998

(30) Foreign Application Priority Data

Oct. 30, 1997 (JP) .............................................. 9-298278

(51) Int. Cl.[7] ................................................. H04N 5/93
(52) U.S. Cl. .............................. 386/54; 386/55; 386/96; 386/125
(58) Field of Search .............................. 386/52, 55, 95, 386/54, 4, 125–126; 360/13; 345/328; 369/32; H04N 5/93

(56) References Cited

U.S. PATENT DOCUMENTS

| | | | | |
|---|---|---|---|---|
| 4,707,733 A | * | 11/1987 | Shinyagaito et al. ....... | 386/125 |
| 5,400,077 A | * | 3/1995 | Cookson et al. ............ | 348/556 |
| 5,467,288 A | * | 11/1995 | Fasciano et al. ............ | 348/328 |
| 5,568,275 A | * | 10/1996 | Norton et al. .............. | 345/328 |
| 5,774,435 A | * | 6/1998 | Hirano ..................... | 369/47.22 |
| 6,016,380 A | * | 1/2000 | Norton ........................ | 386/52 |
| 6,085,020 A | * | 7/2000 | Saito et al. .................... | 386/55 |

* cited by examiner

*Primary Examiner*—Vincent Boccio
(74) *Attorney, Agent, or Firm*—Frommer Lawrence & Haug LLP; William S. Frommer

(57) ABSTRACT

Voice over recording can be performed also with an editing apparatus in which an optical disk is used. While an audio signal of narration or the like is recorded onto the inner circumference side of an optical disk, a video signal recorded on the outer circumference side of the optical disk is reproduced in accordance with an editing list. Alternatively, while an audio signal of narration or the like is once edited using a storage device, a video signal is reproduced from the optical disk and outputted directly or through the storage device. Then, the edited audio signal is recorded onto the optical disk.

23 Claims, 6 Drawing Sheets

EDITING APPARATUS AND EDITING METHOD

BACKGROUND OF THE INVENTION

This invention relates to an editing apparatus and an editing method, and more particularly to an editing apparatus and an editing method which can be applied to a field editing system which edits, for example, a program whose data have been collected at a site.

In related art technology, at a data collecting site or the like which is a field outside a broadcasting station, a program of collected data can be edited by a simple editing system so that a result of the data collection can be broadcasted rapidly. An editing system of the type mentioned is generally constructed such that contents of collected data recorded on a magnetic tape are recorded once onto a hard disk unit as an intermediate recording medium and then edited so that they can be edited efficiently.

In particular, if a result of data collection is edited in a field by so-called AB roll editing in which two video tape recorders are used, then much time is required for such operations as fast feeding and rewinding of a magnetic tape to index it to a desired cut, and the time is required as much for the editing operation.

Therefore, an editing system which uses an intermediate recording medium duplicates a video signal and an audio signal recorded once onto a magnetic tape by means of, for example, a video tape recorder formed as a unit together with a camera onto a hard disk unit. Then, the video signal and the audio signal on the hard disk unit are reproduced to set editing points to produce an editing list, and then, they are recorded onto a magnetic tape in accordance with the editing list.

With the editing system described above, the time required for setting of editing points can be reduced significantly when compared with the AB roll editing in which a magnetic tape is used, and a result of data collection, for example, for news coverage can be broadcasted in a short time as much.

The editing system, however, requires much time to duplicate a video signal and an audio signal recorded on a magnetic tape onto an intermediate recording medium. Incidentally, even when it is tried to record a result of data collection for 30 minutes onto a hard disk unit, for example, at a quadruple speed, a time as long as seven minutes and 30 seconds is required to record the data onto the hard disk unit.

Further, a result of editing is re-recorded onto a magnetic tape and brought back to a broadcasting station. Also such re-recording of a video signal onto a magnetic tape requires much time.

Assuming that the time required for such operations of the types mentioned as above can be reduced, processing of a result of data collection can be performed significantly efficiently when compared with a related art system, then the convenience in use of a system of the type described can be further improved.

In this instance, it is considered that, if a common recording medium in the form of an optical disk is used in place of a magnetic tape to perform processing from imaging to editing, then the processing of duplication of a video signal and an audio signal onto an intermediate recording medium can be omitted. It is also considered that, if an editing list is recorded onto the optical disk and the optical disk is brought back to a broadcasting station, then also an operation of re-recording the result of editing can be omitted. Further, where an optical disk is used, since it allows random accessing, also processing of non-linear editing can be performed similarly as in a case wherein a video signal and an audio signal are recorded on a hard disk apparatus. Consequently, it is anticipated that an editing operation can be performed efficiently.

However, where an optical disk is used, it is considered that so-called voice over recording is difficult.

In particular, in an editing operation in which a magnetic tape is used, for example, narration, background music or the like is allocated to contents of collected data by pre-voice over recording wherein a video signal is edited and recorded onto a magnetic tape after an audio signal is edited and recorded onto the magnetic tape or by after-voice over recording wherein an audio signal is edited and recorded onto a magnetic tape after a video signal is edited and recorded onto the magnetic tape.

In both voice over recordings, while an audio signal or a video signal recorded on a magnetic tape in advance is monitored, a corresponding video signal or audio signal is carried into after recording. Consequently, in order to perform voice over recording with an editing system in which an optical disk is used, while a video signal or an audio signal recorded on an optical disk is reproduced, an audio signal or a video signal must be recorded onto the optical disk.

However, an optical disk is driven in the condition of a fixed linear velocity so that desired data can be recorded in a high density onto it. Consequently, it is considered that it is difficult to record an audio signal and a video signal simultaneously onto an optical disk or reproduce an audio signal and a video signal recorded in different regions of an optical disk simultaneously. This makes voice over recording difficult after all.

SUMMARY OF THE INVENTION

It is an object of the present invention to provide an editing apparatus and an editing method by which voice over recording can be performed even where an optical disk is used for a procedure from data collection to editing.

In order to attain the object described above, according to the present invention, an editing apparatus and an editing method are generally constructed such that, while an audio signal of narration or the like is recorded onto the inner circumference side of an optical disk, a video signal recorded on the outer circumference side of the optical disk is reproduced, or while an audio signal such as narration is edited once using a storage means, a video signal is reproduced from an optical disk and outputted directly or through the storage device and then the edited audio signal is recorded onto the optical disk, thereby allowing voice over recording even with an editing apparatus in which an optical disk is used.

In particular, according to an aspect of the present invention, there is provided an editing apparatus which accesses a disk type recording medium on which a video signal and an audio signal are recorded in substantially equal line recording densities on the inner circumference side and the outer circumference side of the disk type recording medium, comprising, the disk type recording medium having an information recording face which is divided into concentric areas in outer circumference side ones of which recording areas for a video signal and an audio signal are formed and in an innermost circumference one of which a recording area for data of an editing list of the video signal and an auxiliary audio signal corresponding to the video signal of a result of editing based on the editing list is formed, an audio recording system for recording the auxiliary audio signal into the recording area for the auxiliary audio data, and a video reproduction system for accessing the disk type recording medium in accordance with the editing list in response to processing of the audio recording system to reproduce the video signal of a result of editing from the disk type recording medium and continuously outputting the reproduced video signal.

In the editing apparatus, a disk type recording medium on which a video signal is recorded in substantially equal line recording densities on the inner circumference side and the outer circumference side of the disk type recording medium is used, and, in addition to data of an editing list of a video signal, an auxiliary audio signal corresponding to the video signal of a result of editing based on the editing list is recorded into the innermost circumference area of the disk type recording medium. Consequently, the video signal recorded on the outer circumference side can be reproduced at a transfer rate higher than that upon recording. Accordingly, in a corresponding relationship to this processing, if the video signal of the result of editing is reproduced from the disk type recording medium in accordance with the editing list and is outputted as a continuous video signal, so-called after-voice over recording can be performed by allocating narration or the like to the auxiliary audio signal while the video signal edited formerly is monitored. On the other hand, by reversely performing that just described as above, pre-voice over recording can be performed by an operation based on the editing list after an audio signal is recorded.

The editing apparatus may be constructed such that the audio recording system includes an audio signal recording means for temporarily storing the auxiliary audio signal, an audio signal outputting means for outputting the auxiliary signal stored in the audio signal storage means to an external apparatus, and an audio signal recording means for recording the auxiliary audio signal stored in the audio signal storage means onto the disk type recording medium, and the video reproduction system accesses, in processing for temporarily storing the auxiliary audio signal into the audio signal storage means or in processing for outputting the auxiliary audio signal stored in the audio signal storage means by the outputting means, the disk type recording means in accordance with the editing list to reproduce the video signal of a result of editing from the disk type recording medium and continuously outputs the reproduced video signal.

In the editing apparatus, an auxiliary audio signal corresponding to a video signal of a result of editing can be temporarily stored and outputted when necessary, and the temporarily stored auxiliary audio signal can be recorded onto the disk type recording medium. Consequently, in whichever area the auxiliary audio signal or the video signal is to be stored, for a period of time for which the auxiliary audio signal is temporarily stored into the audio signal storage means and then edited, the disk type recording medium can be driven to rotate at a desired velocity of rotation to reproduce the corresponding video signal. Further, when necessary, the auxiliary audio signal for which editing has completed can be recorded onto the disk type recording medium in a short time. Consequently, so-called after-voice over recording can be performed by allocating narration or the like to the auxiliary audio signal while the video signal edited formerly is monitored. Further, when the auxiliary audio signal is edited formerly, the video signal can be reproduced by an operation based on the editing list while the auxiliary audio signal stored in the audio signal storage means is reproduced, thereby performing pre-voice over recording.

The editing apparatus may be further constructed such that the video reproduction system includes a video signal storage means for temporarily storing the reproduced video signal and a video outputting means for outputting the video signal temporarily stored in the video signal storage means, and outputs, in processing for temporarily storing the auxiliary audio signal into the audio signal storage means, in processing for outputting the auxiliary audio signal stored in the audio signal storage means through the outputting means or in processing for recording the auxiliary audio signal temporarily stored in the audio signal storage means onto the disk type recording medium, the video signal temporarily stored in the video signal storage means at a rate corresponding to the auxiliary audio signal.

In the editing apparatus, the video reproduction system can temporarily store the reproduced video signal into the video signal storage means and output the video signal temporarily stored in the video signal recording medium at a rate corresponding to the auxiliary audio signal in a corresponding relationship to processing of the audio recording system. Consequently, upon editing of the audio signal, editing processing can be performed while the video signal stored in the video signal storage means is monitored without the necessity for frequently changing over the velocity of rotation of the disk type recording medium. Further, in this instance, a result of the editing can be confirmed at a desired rate. Further, also when the edited auxiliary audio signal is to be recorded onto the disk type recording medium, the video signal can be monitored at the corresponding rate.

According to another aspect of the present invention, there is provided an editing method wherein a disk type recording medium on which a video signal is recorded in substantially equal line recording densities on the inner circumference side and the outer circumference side of the disk type recording medium is accessed to edit the video signal recorded on the disk type recording medium, comprising the steps of driving the disk type recording medium to rotate at a linear velocity for the inner circumference side of the disk type recording medium, recording data of an editing list of the video signal and an auxiliary audio signal corresponding to the video signal of a result of editing based on the editing list onto the inner circumference side of the disk type recording medium, and accessing the outer circumference side of the disk type recording medium in accordance with the editing list in a corresponding relationship to the recording of the auxiliary audio signal to reproduce the video signal of the result of editing from the disk type recording medium and continuously outputting the reproduced video signal.

In the editing apparatus, a disk type recording medium on which a video signal is recorded in substantially equal line recording densities on the inner circumference side and the outer circumference side of the disk type recording medium is used, and the disk type recording medium is driven to rotate at a linear velocity of the inner circumference side to record, onto the inner circumference side of the disk type recording medium, data of an editing list of the video signal and an auxiliary audio signal corresponding to the video signal of a result of editing based on the editing list. Consequently, in the outer circumference side area of the disk type recording medium, the video signal can be reproduced at a transfer rate higher than that upon recording. Accordingly, if, in a corresponding relationship to the recording of the auxiliary audio signal, the outer circumference side of the disk type recording medium is accessed in accordance with the editing list to continuously output a reproduced video signal, then so-called after-voice over recording can be performed. On the other hand, by reversely performing that just described as above, pre-voice over recording can be performed by an operation based on the editing list after an audio signal is recorded.

According to a further aspect of the present invention, there is provided an editing method wherein a disk type recording medium on which a video signal is recorded in substantially equal line recording densities on the inner circumference side and the outer circumference side and that is accessed to edit the video signal recorded on the disk type recording medium, comprising the steps of recording data of an editing list of the video signal into a predetermined area of the disk type recording medium, editing, using predetermined audio signal storage means, an auxiliary audio signal corresponding to the video signal of a result of editing based on the editing list and recording the edited auxiliary audio signal into the predetermined area of the disk type recording medium, and accessing, upon editing of the auxiliary audio signal in which the audio signal recording medium is used, the outer circumference side of the disk type recording medium in accordance with the editing list to reproduce the video signal of the result of editing from the disk type recording medium and continuously outputting the reproduced video signal.

In the editing method, data of an editing list of a video signal is recorded into the predetermined area of a disk type recording medium, and the predetermined storage means is used to edit an auxiliary audio signal corresponding to the video signal of a result of editing based on the editing list and the edited auxiliary audio signal is recorded into the predetermined area of the disk type recording medium. Consequently, in whichever area the auxiliary audio signal or the video signal is to be stored, for a period of time for which the auxiliary audio signal is temporarily stored into the audio signal storage means and then edited, the disk type recording medium can be driven to rotate at a desired velocity of rotation to reproduce the corresponding video signal. Further, when necessary, the auxiliary audio signal for which editing has completed can be recorded onto the disk type recording medium in a short time. Consequently, so-called after-voice over recording can be performed by allocating narration or the like to the auxiliary audio signal while the video signal edited formerly is monitored. Further, when the auxiliary audio signal is edited formerly, the video signal can be reproduced by an operation based on the editing list while the auxiliary audio signal stored in the audio signal storage means is reproduced, thereby performing pre-voice over recording.

In this instance, the editing method may further comprise the steps of temporarily storing the reproduced video signal into video signal storage means, and outputting the reproduced video signal temporarily stored in the video signal storage means at a rate corresponding to the auxiliary audio signal when the auxiliary signal is to be edited using the audio signal storage means or when the edited auxiliary audio signal is to be recorded.

In the editing method, the reproduced video signal is temporarily stored into the video signal storage means, and when the edited auxiliary signal is to be edited using the audio signal storage means or when the edited auxiliary audio signal is to be recorded, the reproduced video signal temporarily stored in the video signal storage means is outputted at a rate corresponding to the auxiliary audio signal. Consequently, upon editing of the audio signal, editing processing can be performed while the video signal edited formerly is monitored without the necessity for frequently changing over the velocity of rotation of the disk type recording medium. Further, in this instance, a result of the editing can be confirmed at a desired rate. Further, also when the edited auxiliary audio signal is to be recorded onto the disk type recording medium, the video signal can be monitored at the corresponding rate.

With the editing apparatus and the editing methods described above, an optical disk can be used to perform voice over recording by reproducing a video signal recorded on the outer circumference side of the optical disk in accordance with an editing list while an audio signal of narration or the like is recorded onto the inner circumference side of the optical disk or by reproducing, while an audio signal of narration or the like is edited once using the audio signal storage means, a video signal from an optical disk and outputting the video signal directly or through the audio signal storage means and then recording the edited audio signal onto the optical disk.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

1. First Embodiment 1-1. Construction of the First Embodiment

Figure 2:
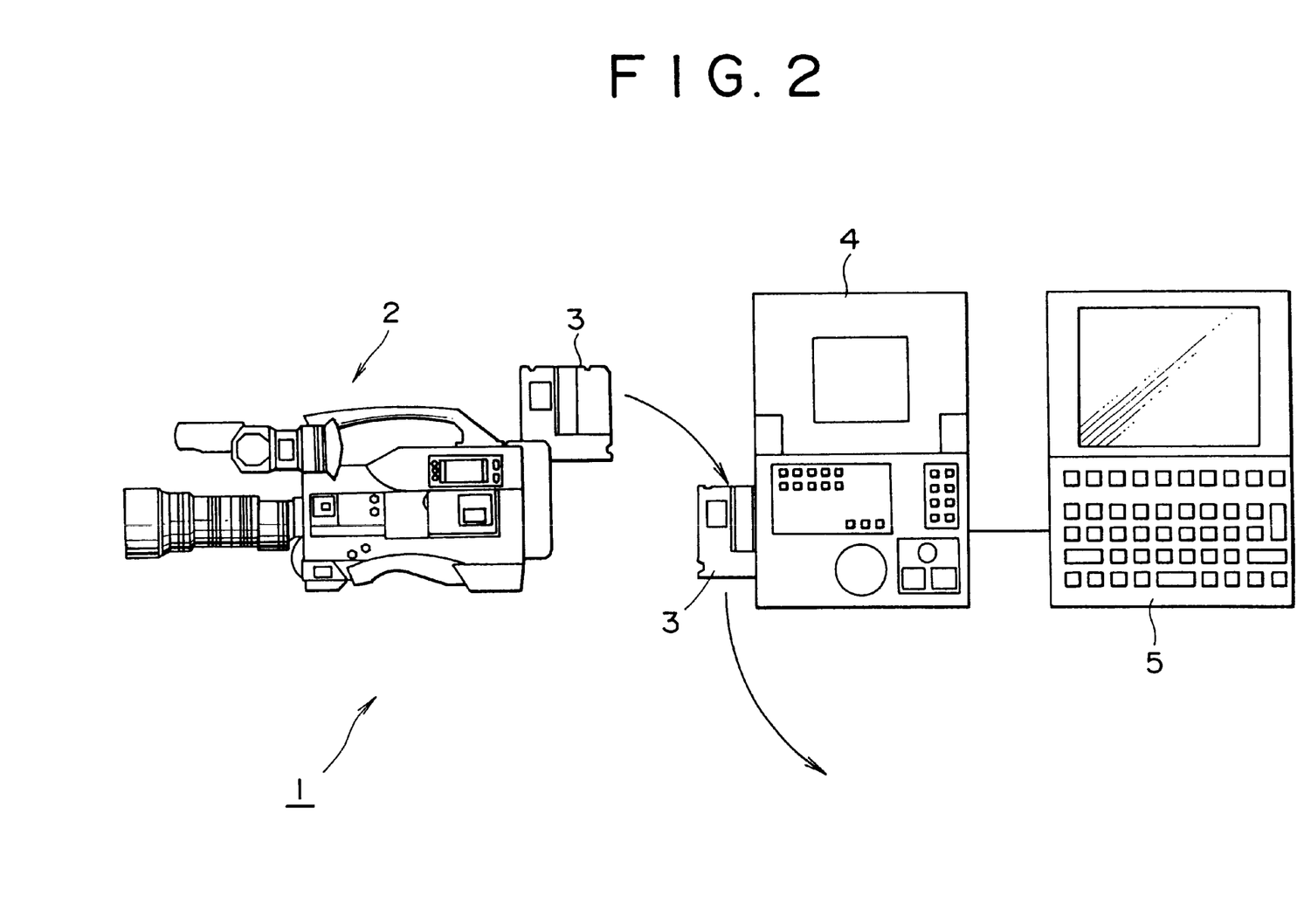
FIG. 2 is a plan view showing an editing system to which the present invention is applied and in which the optical disk shown in FIG. 1 is used.

Referring first to FIG. 2, there is shown an editing system to which the present invention is applied. The editing system shown is generally denoted at 1 and records a digital video signal and a digital audio signal, which are contents of collected data, onto an optical disk 3 using a television camera 2. In the editing system 1, after collection of data is completed, the optical disk 3 is removed from the television camera 2 and loaded, for example, into a viewer 4 carried on a vehicle. Then, the viewer 4 is operated under the control of a personal computer 5 to edit the digital video signal and the digital audio signal recorded on the optical disk 3.

To this end, the television camera 2 records a digital video signal and a digital audio signal obtained by imaging a desired imaging subject in a predetermined format onto the optical disk 3. The viewer 4 reproduces the digital video signal and the digital audio signal recorded on the optical disk 3 and accepts setting of editing points or performs voice over recording when necessary. The personal computer 5 controls operation of the viewer 4 and accepts setting of editing points in response to an operation of a menu displayed on a display screen. Further, the personal computer 5 produces an editing list based on the set editing points and controls the viewer 4 to record the editing list onto the optical disk 3.

Consequently, the editing system 1 allows the optical disk 3 to be brought back to a broadcasting station so that a result of the editing of the contents of collected data recorded on the optical disk 3 can be broadcasted immediately in accordance with the editing list recorded on the optical disk 3 or allows the result of editing to be directly transmitted to the broadcasting station by the viewer 4 over an SNG line or the like when necessary.

Figures 1A, 1B:
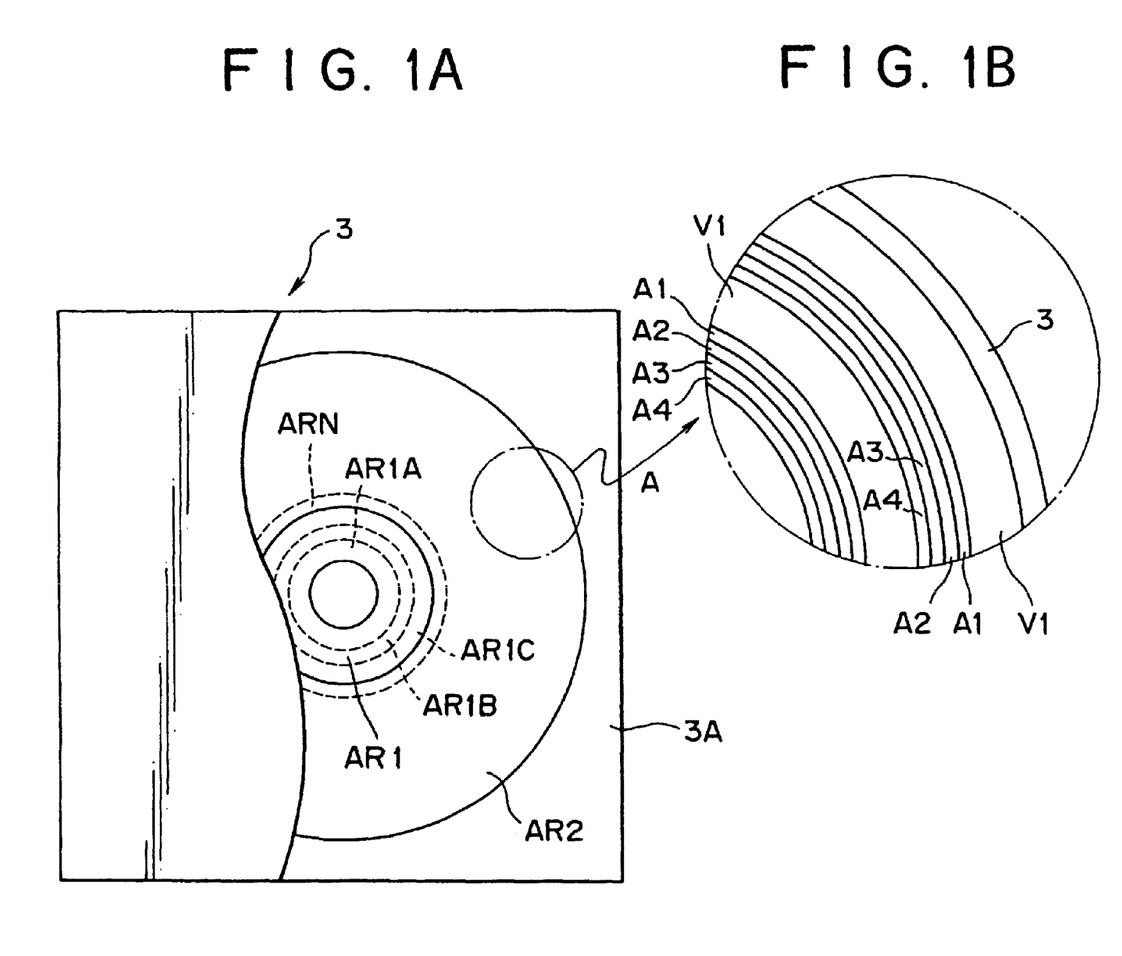
FIG. 1 is a plan view showing an optical disk which is used in an editing system according to the present invention.

FIG. 1 shows a plan view of the optical disk 3 which can be used in the editing system 1. Referring to FIG. 1, the optical disk 3 shown is accommodated in and carried together with a predetermined cartridge 3A so that admission of dust or foreign articles to the optical disk 3 can be prevented effectively. When the optical disk 3 is loaded into an applicable apparatus such as the television camera 2 or the viewer 4, a shutter mounted on the cartridge 3A is slidably moved to expose an information recording face of the optical disk 3 so that the optical disk 3 can be accessed by the television camera 2 or the viewer 4.

The optical disk 3 is a re-writable phase change type optical disk having information recording faces on the opposite faces thereof, and has pre-grooves, which serve as guide grooves for a laser beam, formed in a serpentine pattern thereon. The optical disk 3 is driven to rotate such that the serpentine period of the pre-grooves at an irradiation point of a laser beam may be a fixed period. Consequently, the optical disk 3 is driven to rotate in accordance with the ZCLV (Zone Constant Linear Velocity) condition.

The optical disk 3 has a system data area AR1 formed on the inner circumference side thereof. The system data area AR1 is divided into three concentric areas AR1A, AR1B and AR1C, and the innermost circumferential area AR1A has management data recorded thereon which were recorded when the optical disk 3 was manufactured. The management data include an optical amount of light to be used for recording of data to the optical disk 3, a common serial number of the optical disk 3, unique identification data allocated to the optical disk 3, and so forth.

In the second innermost circumferential area AR1B, management data for a digital video signal and a digital audio signal recorded on the optical disk 3 are recorded. The management data therein include address information of recording start positions and recording end positions of individual files composed of digital video signals and digital audio signals, time codes of recording start points of time and recording end points of time, identification data set by a cameraman of whether or not each file allows editing, and data of conditions upon imaging. The data of conditions upon imaging include imaging dates, places, names of cameramen, and setting data of the television camera which include a white balance set for the television camera 2, a gain, a set level of an audio signal, data of an aperture, and so forth. Consequently, with the optical disk 3, a history and so forth of each file recorded thereon can be confirmed based on the management data recorded in the area AR1B.

Next, in the outermost circumferential region AR1C, data for editing are recorded. The editing data are recorded in the form of a file, and include editing lists to be used for editing of files recorded on the optical disk 3. The editing lists are formed by recording data of editing points set for the individual files as time codes and addresses, which define playback orders of the files, together with transition forms (for example, cut editing, cross fading and so forth). Consequently, if a desired editing list is selected, then contents of collected data can be successively reproduced from the optical disk 3 in accordance with the selected editing list.

In contrast, the outer circumference side region AR2 is allocated to a user area so that a digital video signal and a digital audio signal are recorded. The optical disk 3 is zoned concentrically by pre-pits formed between the pre-grooves so that 24 zones are formed. Each zone has 1,880 tracks formed therein, and 17 sectors per track are allocated to the innermost circumferential zone. The number of sectors allocated per zone successively increases from the inner circumference side to the outer circumference side, and to the outermost circumferential zone, 40 sectors per track are allocated. Each sector allows recording of data of 2 kilobytes therein. Consequently, data of approximately 64 megabytes can be recorded in the innermost circumferential zone 0.

In the user area AR2, a data area ARN including the two innermost circumference side zones 0 and 1 is allocated as a region for narration data into which an audio signal for narration is to be recorded. More particularly, the narration data area ARN is allocated as a region for exclusive use of a digital video signal of an editing list recorded in the area AR1C, and thus narration, background music or the like of the digital video signal is recorded.

In contrast, the remaining outer circumference side area of the user area AR2 is concentrically divided into five areas independently of the zoning by the sectors, and the outermost circumferential area of each of the five areas is allocated as a recording area for a digital video signal V1 while the remaining four inner circumference side areas of each concentric region are allocated as recording areas for digital audio signals A1 to A4 of four channels. Consequently, the optical disk 3 allows recording thereon of, for example, sound of an imaging subject and surroundings when the imaging subject is imaged (such sound will be hereinafter referred to as environmental sound), voice of commentary by an announcer, voice of commentary in various languages, background music and so forth in a corresponding relationship to a digital video signal.

Figure 3:
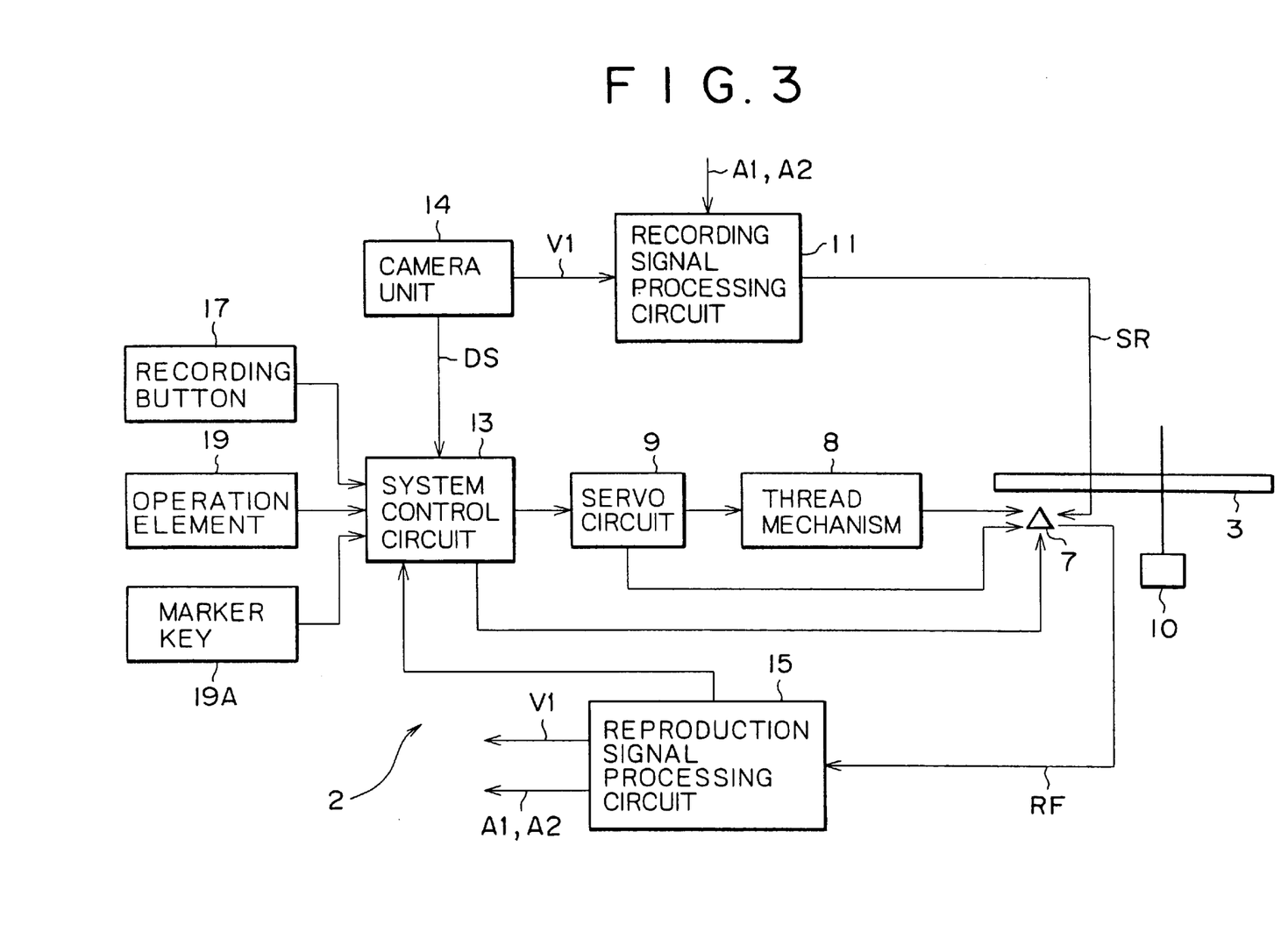
FIG. 3 is a block diagram showing a television camera of the editing system of FIG. 2.

FIG. 3 shows a block diagram of the television camera 2 of the editing system 1 shown in FIG. 2. The television camera 2 removably carries the optical disk 3 thereon, and records a digital video signal onto the optical disk 3 and further records a digital audio signal of environmental sound, a digital audio signal originating from voice of an announcer and so forth, which are incidental to the digital video signal.

Referring to FIG. 3, the television camera 2 shown includes a thread mechanism 8 which moves an optical pickup 7 in a radial direction of the optical disk 3 under the control of a servo circuit 9. The optical pickup 7 successively accesses the different areas of the user area AR2 at predetermined time intervals to record a digital video signal and a digital audio signal into corresponding ones of the recording areas or reproduce a digital video signal and a digital audio signal recorded in these areas. On the other hand, upon starting of accessing to the optical disk 3, the optical pickup 7 does seeks the system data area AR1.

Further, the optical pickup 7 irradiates a laser beam upon the optical disk 3 and receives returning light from the optical disk 3 to produce and output a reproduction signal RF having a signal level which varies in response to the amount of the returning light.

Further, upon recording, the optical pickup 7 successively and cyclically does seeks, by the thread mechanism 8, the user area AR2 and is successively displaced, in each area, from the outer circumference side to the inner circumference side to thermally record a digital video signal and a digital audio signal onto the optical disk 3. Consequently, in the television camera 2 successively records a digital video signal and a digital audio signal onto the optical disk 3 from an outer circumference side region on which data recorded at a high transfer rate can be reproduced when the optical disk 3 is driven to rotate in the condition of a fixed angular velocity toward the inner circumference side.

The servo circuit 9 controls, upon recording, rotation of a spindle motor 10 in the condition of the ZCLV, and controls, upon playback, rotation of the spindle motor 10 in the condition of a fixed angular velocity by a predetermined velocity of rotation. Further, the servo circuit 9 performs tracking control and focusing control of the optical pickup 7. Furthermore, if the optical disk 3 is loaded into the television camera 2, then the servo circuit 9 drives the thread mechanism 8 under the control of a system control circuit 13 to cause the optical pickup 7 to do seeks the system data area AR1 of the optical disk 3. Consequently, in the television camera 2, various management data recorded in the system data area AR1 can be acquired by the system control circuit 13 in advance. Conversely, when power supply to the television camera 2 is disconnected or when the optical disk 3 is ejected, the servo circuit 9 similarly drives the thread mechanism 8 to cause the optical pickup 7 to do seeks the system data area AR1 of the optical disk 3 so that management data can be additionally recorded into the system data area AR1 when necessary.

A camera unit 14 includes an optical system for imaging an imaging subject, a CCD (Charge Coupled Device) solid-state imaging device for imaging an image subject obtained by the optical system, and a signal processing system which processes an output signal of the CCD solid-state imaging device and outputs a digital video signal V1. In the signal processing of the camera unit 14, the camera unit 14 sets, under the control of a control circuit provided therein, a white balance, a gain, a level of an audio signal, an aperture and so forth as imaging conditions and reports setting data DS representing thus set conditions to the system control circuit 13. Meanwhile, the camera unit 14 reports a time code of the digital video signal V1 to the system control circuit 13.

A recording signal processing circuit 11 converts the digital video signal V1 outputted from the camera unit 14 into a recording signal SR together with digital audio signals A1 and A2 of 2 channels and outputs the recording signal SR. Of the digital audio signals A1 and A2 of 2 channels, the digital audio signal A1 of first channel is a stereo digital audio signal originating from a so-called front microphone, and generally, environmental sound is allocated to the digital audio signal A1. Meanwhile, the digital audio signal A2 of the second channel is a digital audio signal originating from a so-called rear microphone, and for example, voice of commentary by an announcer is allocated to the digital audio signal A2. Consequently, the television camera 2 records digital audio signals of 2 channels from among digital audio signals A1 to A4 of 4 channels which can be recorded onto the optical disk 3.

Thus, the recording signal processing circuit 11 corrects the signal level of the digital video signal V1 outputted from the camera unit 14, removes unnecessary data such as blanking periods from the digital video signal V1 of the corrected signal level, successively compresses the resulting data in accordance with a format prescribed by the MPEG (Moving Picture Experts Group) standards and outputs the compressed data. Further, the recording signal processing circuit 11 converts thus compressed video data into blocks in a predetermined data unit and adds error correction codes in the form of product codes to the blocks to form ECC (Error Correction Coding) data blocks.

Further, the recording signal processing circuit 11 adds, after it corrects the signal level of the digital audio signals A1 and A2, error correction codes in the form of product codes to form ECC data blocks also for the audio data. The recording signal processing circuit 11 interleaves both ECC data blocks of the video data and the audio data produced in this manner, channel codes the interleaved ECC data blocks in accordance with a modulation method suitable for recording onto the optical disk 3, adds necessary data such as a synchronization pattern, a preamble and a postamble to the channel coded ECC data blocks to convert the ECC data blocks into a recording signal SR.

In the sequence of processes described above, after the recording signal processing circuit 11 outputs the recording signal SR originating from the video data V1 by a predetermined amount, it outputs the recording signal SR originating from the digital audio signal A1 of the first channel after lapse of a time required for doing seeks by the optical pickup 7. Then, the recording signal processing circuit 11 outputs, after lapse of a time required for doing seeks by the optical pickup 7, the recording signal SR originating from the digital audio signal A2 of the second channel, and then, it outputs the recording signal SR originating from the digital video signal V1 again after lapse of the time required for seeking by the optical pickup 7.

Consequently, the television camera 2 records the video data V1 and the audio data A1 and A2 into respective corresponding areas described hereinabove with reference to FIG. 1.

A reproduction signal processing circuit 15 processes a reproduction signal RF outputted from the optical pickup 7 to reproduce the digital video signal V1 and the digital audio signals A1 and A2 and outputs them to a viewfinder or an external apparatus. Consequently, with the television camera 2, a result of imaging can be monitored immediately when necessary. Further, when the optical pickup 7 accesses the system data area AR1 immediately after the optical disk 3 is loaded, the reproduction signal processing circuit 15 reproduces management data recorded in the system data area AR1 in place of the digital video signal V1 and the digital audio signals A1 and A2 and outputs the management data to the system control circuit 13.

In particular, the reproduction signal processing circuit 15 waveform equalizes and binary digitizes the reproduction signal RF outputted from the optical pickup 7 and then reproduces a clock signal. Further, the reproduction signal processing circuit 15 successively performs analog-to-digital conversion processing of the reproduction signal RF using the clock signal to obtain a digital reproduction signal. Then, the reproduction signal processing circuit 15 applies a technique of PRML to process the digital reproduction signal to produce reproduction data. Further, the reproduction signal processing circuit 15 interleaves the reproduction data and performs error correction processing and data decompression processing for the interleaved reproduction data to reproduce the digital video signal V1 and the digital audio signals A1 and A2. Consequently, with the television camera 2, a result of data collection recorded on the optical disk 3 can be confirmed at the site.

The system control circuit 13 is formed from a microcomputer which controls a recording and playback system of the television camera 2, and when the optical disk 3 is loaded into the television camera 2, the system control circuit 13 controls operation of the servo circuit 9 and the reproduction signal processing circuit 15 to acquire the management data recorded in the system data area AR1.

Further, if a recording button 17 is repetitively depressed by a cameraman, the system control circuit 13 changes over operation of the recording signal processing circuit 11 and the servo circuit 9 in response to the depression so that the digital video signal V1 and the digital audio signals A1 and A2 are recorded onto the optical disk 3 or such recording onto the optical disk 3 is stopped. In this instance, the system control circuit 13 controls the optical pickup 7 to perform seeks with reference to the management data acquired from the system data area AR1 so that the digital video signal V1 and the digital audio signals A1 and A2 are recorded into a non-recorded region of the optical disk 3. Further, the system control circuit 13 temporarily stores a time code and an address of the optical disk 3 at a point of time of starting of recording or a point of time of completion of recording corresponding to the depressing operation of the recording button 17 into a memory therein.

Further, the system control circuit 13 temporarily stores data of a day and an hour as well as a place of imaging and a name of a cameraman which are inputted by an operation of an operation element 19, identification data representative of whether the file allows editing or not depending upon an operation of a marker key 19A and setting data DS reported from the camera unit 14 into the memory. The system control circuit 13 forms management data of files recorded on the optical disk 3 based on the data temporarily stored in the memory in this manner and additionally writes the management data into the system data area of the optical disk 3 through a driver circuit not shown when the optical disk 3 is ejected or the like.

Further, if the cameraman operates an operation button for playback or the like, then the system control circuit 13 starts operation of the reproduction signal processing circuit 15 so that a file recorded on the optical disk 3 may be monitored when necessary.

Figure 4:
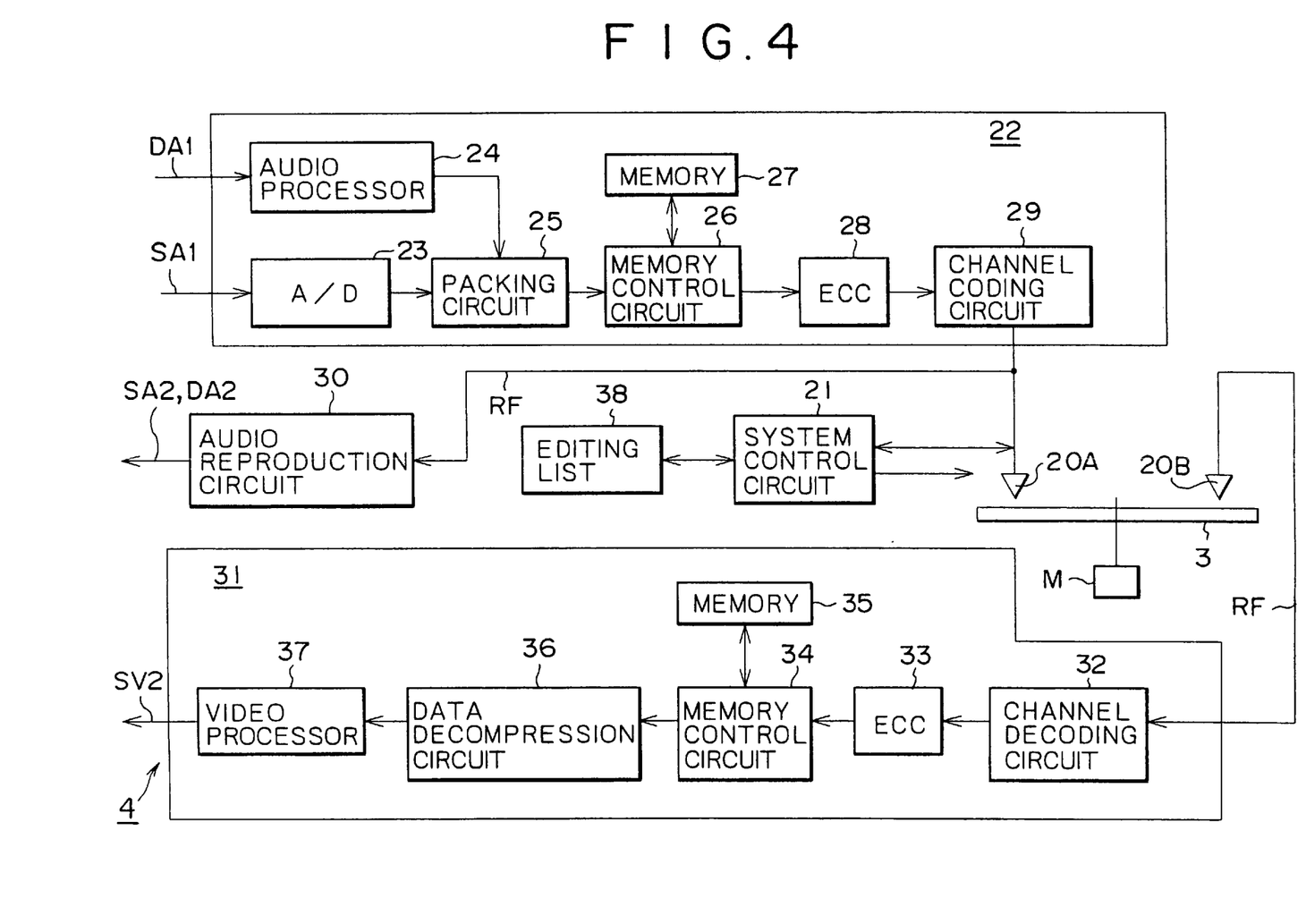
FIG. 4 is a block diagram showing a form of a viewer of the editing system of FIG. 2.

FIG. 4 shows a block diagram of the viewer 4 for editing an optical disk onto which a video signal and an audio signal are recorded at a site of data collection in this manner. Referring to FIG. 4, the viewer 4 is generally constructed such that a GUI (Graphical User Interface) is displayed on the display unit so as to allow an editing operation to be performed when operation elements of the GUI are operated, and further that the viewer 4 is used to confirm a result of editing of a video signal and confirm a result of editing of an audio signal by means of a speaker built therein.

Further, the viewer 4 is connected to the personal computer 5 by, for example, a SCSI (Small Computer System Interface), an Ethernet, an IEEE (The Institute of Electrical and Electronics Engineers, Inc.) 1394 or the like so that it can perform editing processing and allow confirmation of contents of the editing under the control of the personal computer 5.

In particular, the viewer 4 includes a pair of optical pickups 20A and 20B which are each movable in radial directions of the optical disk 3 by thread mechanisms to access recording areas of an audio signal and a video signal, respectively. Consequently, the viewer 4 can simultaneously and parallelly reproduce a digital video signal and a digital audio signal which were recorded at difference places and at different times. Further, the optical pickup 20A accesses the system data area AR1 and the narration data area ARN to reproduce or update contents recorded in the areas AR1 and ARN, respectively.

A spindle motor M drives, upon ordinary recording, the optical disk 3 to rotate in the condition of a ZCLV under the control of a spindle servo circuit not shown. In contrast, upon ordinary playback, the spindle motor M drives the optical disk 3 to rotate in the condition of a fixed angular velocity. When the optical disk 3 is to be rotated in the condition of a fixed angular velocity, the velocity of rotation of the optical disk 3 is set to 5,000 rpm which is higher than the velocity of rotation at which the system data area AR1 is accessed in the condition of a ZCLV. Particularly, a digital video signal and a digital audio signal can be reproduced at a data transfer rate of 50 Mbps at the innermost circumference of the user area and at a rate of 120 Mbps at the outermost circumference of the user area of the optical disk 3.

Consequently, the viewer 4 plays back the optical disk 3, on which a digital video signal and a digital audio signal are preferentially recorded from the outermost circumference side in sequence by the television camera 2, to reproduce the digital video signal and the digital audio signal, increasing the data transfer rate toward the outermost circumference side areas in which the signals are recorded preferentially. Consequently, the viewer 4 reproduces a video signal and an audio signal obtained at a high transfer rate and outputs them as a continuous video signal and audio signal while it can effectively utilize waiting times produced by such intermittent reproduction to perform seeks of the optical pickups 20A and 20B.

Further, the spindle motor M drives, upon editing of an audio signal originating from narration, the optical disk 3 to rotate at a velocity of rotation allocated to the narration data area ARN. Consequently, the viewer 4 records an audio signal of narration into the narration data area ARN at a linear velocity corresponding to the narration data area ARN. Further, when the editing processing is after-voice over recording, the viewer 4 reproduces a video signal beginning with the outer circumference side area, from which a reproduction signal at a high transfer rate is obtained, in a simultaneous and parallel relationship to the after-voice over recording, and outputs thus reproduced video signal in a continuous time series.

On the other hand, when an audio signal or a video signal recorded in an area other than the narration data area ARN of the user area AR2 is edited, the spindle motor M drives the optical disk 3 to rotate at a velocity of rotation same as that upon ordinary playback. After an editing list is settled, the spindle motor M drives the optical disk 3 to rotate at a velocity of rotation defined for the system data area AR1 under the control of a system control circuit 21.

An audio recording circuit 22 changes its operation over the optical disk 3 under the control of the system control circuit 21 and drives the optical pickup 20A in response to audio signals DA1 and SA1 originating from narration to record the audio signals DA1 and SA1 onto the optical disk 3 which is driven to rotate in such a manner as described above. In particular, in the audio recording circuit 22, an analog-to-digital conversion circuit (A/D) 23 receives an audio signal SA1 inputted thereto from a microphone through a predetermined amplifier circuit, performs analog-to-digital conversion processing for the audio signal SA1 to produce a digital audio signal of, for example, 16 bits of a sampling output of 48 kHz, and outputs the digital audio signal.

An audio processor 24 corrects the signal level of a digital audio signal DA1 inputted from the outside and outputs the digital audio signal DA1 of the corrected signal level. A packing circuit 25 converts the digital audio signal outputted from the analog-to-digital conversion circuit 23 or the audio processor 24 into blocks and outputs the blocked digital audio signal.

A memory control circuit 26 performs address control of a memory 27 to store output data of the packing circuit 25, performes time-base compression and outputs the data. Here, the memory control circuit 26 outputs audio data having a transfer rate of approximately 1.7 Mbps at a predetermined timing at another transfer rate of 35 Mbps.

An ECC (Error Correction Coding) circuit 28 adds error correction codes to audio data which compose the digital audio signal. Further, the ECC circuit 28 interleaves the audio data and the error correction codes and outputs resulting data.

A channel coding circuit 29 converts output data of the ECC circuit 28 into serial data and modulates the serial data in accordance with a modulation system suitable for recording onto the optical disk 3. Further, the channel coding circuit 29 increases the amount of light of the optical pickup 7 in response to the modulation signal generated in such a manner as just above-described, thereby recording a digital audio signal onto the optical disk 3. Consequently, the audio recording circuit 22 successively records the audio signals SA1 and DA1 for narration into the narration data area ARN.

It is to be noted that, where the areas of the optical disk 3 are allocated in such a manner as in the present embodiment to record a video signal and an audio signal, if it is assumed that the total data amount of the optical disk 3 is approximately 260 MB, then the capacity of approximately 64 MB is allocated to the zone 0, and the narration data area ARN is set for the two innermost side zones 0 and 1 so that narration for approximately 20 to 30 minutes can be recorded. Incidentally, it is considered that, if contents of collected data recorded on the optical disk 3 are edited, then the time actually required for narration is such a short time as 20 minutes or less. Meanwhile, between the zone 0 and the zone 1, the velocity of rotation of the optical disk 3 must be varied by approximately 5%. Therefore, in the present embodiment, the narration data area ARN is set so that the time required for changing over of the velocity of rotation of the optical disk 3 attains a sufficiently short time and narration can be recorded for a sufficiently long time for practical use. Incidentally, where approximately 10 minutes are allocated to narration, the narration data area ARN can be allocated to one zone, thereby eliminating the necessity for changing over of the velocity of rotation of the optical disk 3.

An audio reproduction circuit 30 changes over its operation under the control of the system control circuit 21, and waveform equalizes and binary digitizes the reproduction signal RF outputted from the optical pickup 20A and then reproduces a clock signal. Further, the audio reproduction circuit 30 successively performs analog-to-digital conversion processing of the reproduction signal RF in response to the clock signal to produce a digital reproduction signal, and processes the digital reproduction signal applying a technique of PRML to produce reproduction data. Further, the audio reproduction circuit 30 interleaves the reproduction data, performs error correction processing for them and outputs resulting data as a digital audio signal DA2 or an audio signal SA2 which is an analog signal.

In the series of steps of processing described above, the audio reproduction circuit 30 processes the reproduction signal RF obtained at a high transfer rate corresponding to the velocity of rotation of the optical disk 3 and stores the processed reproduction signal RF into a memory therein, and outputs the stored reproduction signal RF as a continuous audio signal. Consequently, with the viewer 4, contents of the narration recorded by the audio recording circuit 22 can be confirmed by means of the audio reproduction circuit 30, and the narration can be re-recorded repetitively to effect voice over recording when necessary. Further, upon such recording of narration, the viewer 4 can reproduce and monitor a corresponding video signal from the user area AR2 in accordance with an editing list set in advance to effect after-voice over recording. On the other hand, by editing a video signal after narration is recorded without monitoring the video signal, pre-voice over recording can be performed.

In particular, a video reproduction circuit 31 changes over its operation under the control of the system control circuit 21 and processes, by means of a pre-processing circuit thereof not shown, the reproduction signal RF outputted at a high transfer rate from the optical pickup 20B to produce reproduction data. Specifically, the pre-processing circuit performs waveform equalization and binary digitization of the reproduction signal RF and reproduces a clock signal. Further, the pre-processing circuit successively performs analog-to-digital conversion processing of the reproduction signal RF with the clock signal to produce a digital reproduction signal, and applies a technique of PRML to process the digital reproduction signal, thereby producing reproduction data.

A channel decoding circuit 32 performs processing reverse to that of the channel coding circuit 29 to convert the reproduction data, which are obtained, into parallel data and outputs the parallel data. An ECC circuit 33 performs deinterleaving processing and error correction processing of the output data of the channel decoding circuit 32 and outputs resulting data. A memory control circuit 34 performs address control of a memory 35 to temporarily store the output data of the ECC circuit 33, which are outputted, into the memory 35, and outputs the stored data as continuous video data.

A data decompression circuit 36 decompresses the output data of the memory control circuit 34, and a video processor 37 outputs data outputted from the data decompression circuit 36 in accordance with a predetermined format to an external apparatus and displays the same on a monitor.

If power supply is made available or the optical disk 3 is loaded into the viewer 4, then the system control circuit 21 controls the optical pickup 20A to do seeks the system data area AR1 and acquires the management data recorded in the system data area AR1 by processing of the reproduction signal RF by a signal processing circuit not shown. Consequently, the system control circuit 21 stores thus acquired management data into a memory not shown and controls operation of the entire viewer 4 based on the management data.

In particular, the system control circuit 21 controls, in response to an operation of an operation element or under the control of the personal computer 5, the optical pickups 20A and 20B to perform seeks and controls operation of the audio recording circuit 22, audio reproduction circuit 30 and video reproduction circuit 31 and also controls operation of a video recording circuit not shown all based on the management data to record a video signal and an audio signal into the user area AR2 or reproduce a video signal or an audio signal recorded in the user area AR2. It is to be noted that the system control circuit 21 updates the management data stored in the memory thereof in response to such recording of a video signal and an audio signal and records, when the optical disk 3 is ejected or in some other case, thus stored management data onto the optical disk 3.

Upon recording of an audio signal, if an operator selects processing of voice over recording, the system control circuit 21 sets the velocity of rotation of the optical disk 3 to a velocity of rotation conforming to the narration data area ARN in response to the operation of the operator and records audio signals DA1 and SA1 of narration successively inputted thereto from the audio recording circuit 22 onto the optical disk 3.

In this instance, where an audio signal of narration is to be recorded while a video signal based on an editing list edited in advance is monitored for an operation of after-voice over recording, the system control circuit 21 first controls the optical pickup 20B to effect seeks in accordance with an editing list 38 stored in the memory therein or an editing list acquired by reproduction of the system data area of the optical disk 3. Further, the system control circuit 21 controls the video reproduction circuit 31 to process the reproduction signal RF obtained at a higher transfer rate than that of the inner circumference side and displays a corresponding video signal on the monitor.

Further, where it is tried to confirm the narration recorded on the optical disk 3 in this manner, the system control circuit 21 controls the audio reproduction circuit 30 to start up its operation to reproduce an audio signal recorded in the narration data area ARN and output the reproduced audio signal as a continuous audio signal. Further, the system control circuit 21 controls the audio reproduction circuit 30 to reproduce a video signal and output it in a similar manner as in after-voice over recording.

On the other hand, where it is tried to edit a video signal, the system control circuit 21 controls operation of the video reproduction circuit 31 in response to an operation of the operator to reproduce and output the video signal recorded on the optical disk 3 and accepts setting of editing points. Further, based on the editing points thus accepted, the system control circuit 21 produces in the memory thereof an editing list 38 in which file names, time codes, forms of transition at the editing points and so forth are described. Further, the system control circuit 21 plays back the optical disk 3 in accordance with the editing list 38 stored in the memory thereof and accepts updating of the editing list 38 in response to an operation of the operator. If the editing list 38 is settled in this manner and the operator operates a predetermined operation element, then the system control circuit 21 records the editing list 38 into the system data area AR1.

In the editing operation of the video signal, where it is tried to edit the video signal with reference to the audio signal recorded on the optical disk 3 by pre-voice over recording, the system control circuit 21 drives the audio reproduction circuit 30 in response to an operation of the operator so that a corresponding audio signal of narration may be monitored.

Further, where it is tried to confirm the editing result produced in this manner, the video signal is reproduced and outputted based on the audio signal recorded in the narration data area ARN and the editing result in a similar manner as in after-voice over recording.

1-2. Operation of the First Embodiment

In the editing system 1 of FIG. 2 having the construction described above, a digital video signal and a digital audio signal which are contents of collected data are recorded onto the optical disk 3 by the television camera 2. The optical disk 3 is loaded into and played back by the viewer 4 so that a result of the data collection is confirmed. Further, the editing list produced based on the result of the data collection is recorded onto the optical disk 3.

Consequently, the contents of the collected data and the editing list obtained by the editing of the contents of the collected data can be managed in a centralized fashion with a single recording medium, and if the optical disk 3 is brought back from the site of the data collection and successively played back in accordance with the editing list, the contents of the collected data can be used for broadcasting rapidly. Further, in the editing operation, only if the optical disk 3 is loaded into the viewer 4, desired cuts can be selected to perform an editing operation. Consequently, the time required for editing can be reduced significantly when compared with the time required in the related art. Also after the editing, the operation of re-recording data onto a recording medium such as a magnetic tape every time can be omitted.

Further, with the optical disk 3, since identification data to determine whether or not contents of collected data are suitable for editing or the like is recorded as management data, upon editing operation of the contents of collected data, a digital video signal and a digital audio signal recorded on the optical disk 3 based on the management data are selectively reproduced. Consequently, the efficiency of the editing operation is improved as much.

In particular, in the television camera 2 shown in FIG. 3, a digital video signal V1 outputted from the camera unit 14 undergoes predetermined data processing by the recording signal processing circuit 11 and is recorded onto the optical disk 3 in the condition of a ZCLV. Thereupon, the digital video signal and a digital audio signal are successively and cyclically recorded into outer circumference side areas of the user area AR2 from the outermost circumference side (FIG. 1). Consequently, a digital video signal and a digital audio signal are recorded into concentrically divided areas on both faces of the optical disk 3 successively from the outermost circumferential region from which, when the optical disk 3 is driven to rotate in the condition of a fixed angular velocity to play back the same, data can be reproduced at a high transfer rate.

After the recording onto the optical disk 3 is completed, time codes at a point of time of start of recording and another point of time of completion of recording detected from the recording button 17, operation element 19 or marker key 19A, data of addresses of the optical disk 3, a date and an hour and a place of imaging, the name of a cameraman, and identification data of whether or not the file allows editing are recorded by each of the files recorded on the optical disk 3, into the second area AR1B of the system data area AR1 allocated to the inner circumference side of the optical disk 3 together with setting data DS reported from the camera unit 14 (FIG. 1).

Further, the digital video signal and the digital audio signal recorded on the optical disk 3 in this manner are reproduced alternately and outputted as a continuous signal as a reproduction signal RF of a high transfer rate obtained from the optical pickup 7 in the television camera 2 is processed by the reproduction signal processing circuit 15. Consequently, the contents of the collected data recorded on the optical disk 3 are confirmed using the television camera 2 when necessary.

After the data collection by the television camera 2 is completed at the site of the data collection in this manner, the optical disk 3 on which the contents of the collected data are recorded is loaded into the viewer 4, and an editing operation is performed by the viewer 4 and the personal computer 5 (FIG. 4). Here, when power supply to the viewer 4 is made available or the optical disk 3 is loaded into the viewer 4, the system data area AR1 of the optical disk 3 is accessed by the optical pickup 20A so that the management data of the files, the editing list 38 and so forth are acquired by the system control circuit 21.

Further, if the operator operates an operation element disposed on the viewer 4 or operates the personal computer 5, then the system control circuit 21 controls the optical pickups 20A and 20B to effect seeks with reference to the acquired management data so that a digital video signal and a digital audio signal are recorded onto or reproduced from the optical disk 3 in a similar manner as in the television camera 2.

In this instance, if the operator selects processing of voice over recording, then the velocity of rotation of the optical disk 3 is set to a velocity of rotation corresponding to the narration data area ARN in response to the operation of the operator, and audio signals DA1 and SA1 of narration successively inputted from the audio recording circuit 22 are recorded onto the optical disk 3 by the optical pickup 20A.

In particular, a digital audio signal outputted from the analog-to-digital conversion circuit 23 and another digital audio signal outputted from the audio processor 24 are devided into units of a predetermined block by the packing circuit 25 and then time base compressed by the following memory 27 and memory control circuit 26. Further, error correction codes are added to the blocks by the ECC circuit 28, and resulting data are interleaved and outputted to the channel coding circuit 29. Consequently, the channel coding circuit 29 produces a recording signal, with which the optical pickup 20A is driven. Consequently, the audio signals SA1 and DA1 of narration are recorded into the narration data area ARN of the optical disk 3.

In this instance, when the audio signal of narration is to be recorded while a video signal based on the editing list edited in advance is monitored for an operation of after-voice over recording, the system control circuit 21 controls the optical pickup 20B allocated to a video signal to do seeks a corresponding region on the outer circumference side in accordance with the editing list 38 stored in the memory thereof or the editing list 38 acquired from the optical disk 3. Consequently, simultaneously and parallelly with recording of narration, the reproduction signal RF obtained at a higher transfer rate than that on the inner circumference side is processed by the video reproduction circuit 31 so that a corresponding video signal is displayed.

In particular, reproduction data are obtained by the channel decoding circuit 32 and undergo error correction processing by the ECC circuit 33, and then they are stored into the memory 35. Consequently, the video signal reproduced from the optical disk 3 is stored into the memory 35 at a high transfer rate and outputted as a continuous video signal from the memory 35. The video signal is decompressed by and outputted from the data decompression circuit 36 in the next stage.

In the reproduction of a video signal, the optical pickup 20B is controlled to effect seeks within waiting time which occur upon intermittent reproduction of the video signal, and the optical disk 3 is accessed discretely in accordance with the editing list and a continuous video signal is outputted. Consequently, processing of after-voice over recording wherein narration is recorded while contents of editing are monitored based on the editing list is performed.

On the other hand, if editing of a video signal is selected, then the optical pickup 20B performs seeks in response to an operation of the operator based on the management data acquired from the optical disk 3, and a video signal is reproduced by the video reproduction circuit 31. Also in this instance, a reproduction signal RF of a high transfer rate is obtained from the optical disk 3 which is rotated at a high velocity. The reproduction signal RF is processed and outputted as a continuous video signal.

If editing points are set by the operator who monitors thus reproduced video signal, then an editing list 38 based on the editing points is produced in the memory, and the optical disk 3 is played back in accordance with the editing list 38 by an operation of the operator. If the editing points are changed, the editing list 38 is changed. Then, if the editing list 38 is settled and the operator operates a predetermined operation element, the editing list 38 is recorded into the system data area AR1.

When, in the editing operation of a video signal, the video signal is to be edited with reference to an audio signal recorded on the optical disk 3 by pre-voice over recording, the audio reproduction circuit 30 is driven in response to an operation of the operator, and a corresponding audio signal of narration is reproduced. Consequently, a result of the editing by pre-voice over recording is recorded onto the optical disk 3.

Thus, in the present embodiment, whichever one of an audio signal and a video signal is edited first, the video signal and the audio signal can be re-edited again while a result of editing of the audio signal and/or the video signal is monitored. Actually, an editing operation by a video tape recorder is disadvantageous in that, once an audio signal of narration or a video signal of a result of editing is recorded onto a magnetic tape, it is very complicated to re-edit the video signal.

However, with the editing system 1 of the present embodiment, when it is tried to re-edit an audio signal of narration, such re-editing can be performed in a similar manner as in after-voice over recording, and when it is tried to re-edit a result of editing of a video signal, such re-editing can be performed in a similar manner as in pre-voice over recording.

In both of pre-voice over recording and after-voice over recording, in the viewer 4, an audio signal recorded in the narration data area ARN is reproduced by the audio reproduction circuit 30, and a video signal is reproduced in accordance with the editing list by the video reproduction circuit 31. Thus, the audio signal and the video signal are outputted continuously.

1-3. Advantage of the First Embodiment

With the editing system 1 having the construction described above, since a recording area for an audio signal originating from narration is disposed on the inner circumference side of the optical disk 3 and an audio signal of narration is recorded into the recording region for an audio signal while a video signal recorded on the outer circumference side is reproduced in accordance with an editing list, thus voice over recording can be performed.

2. Second Embodiment

Figure 5:
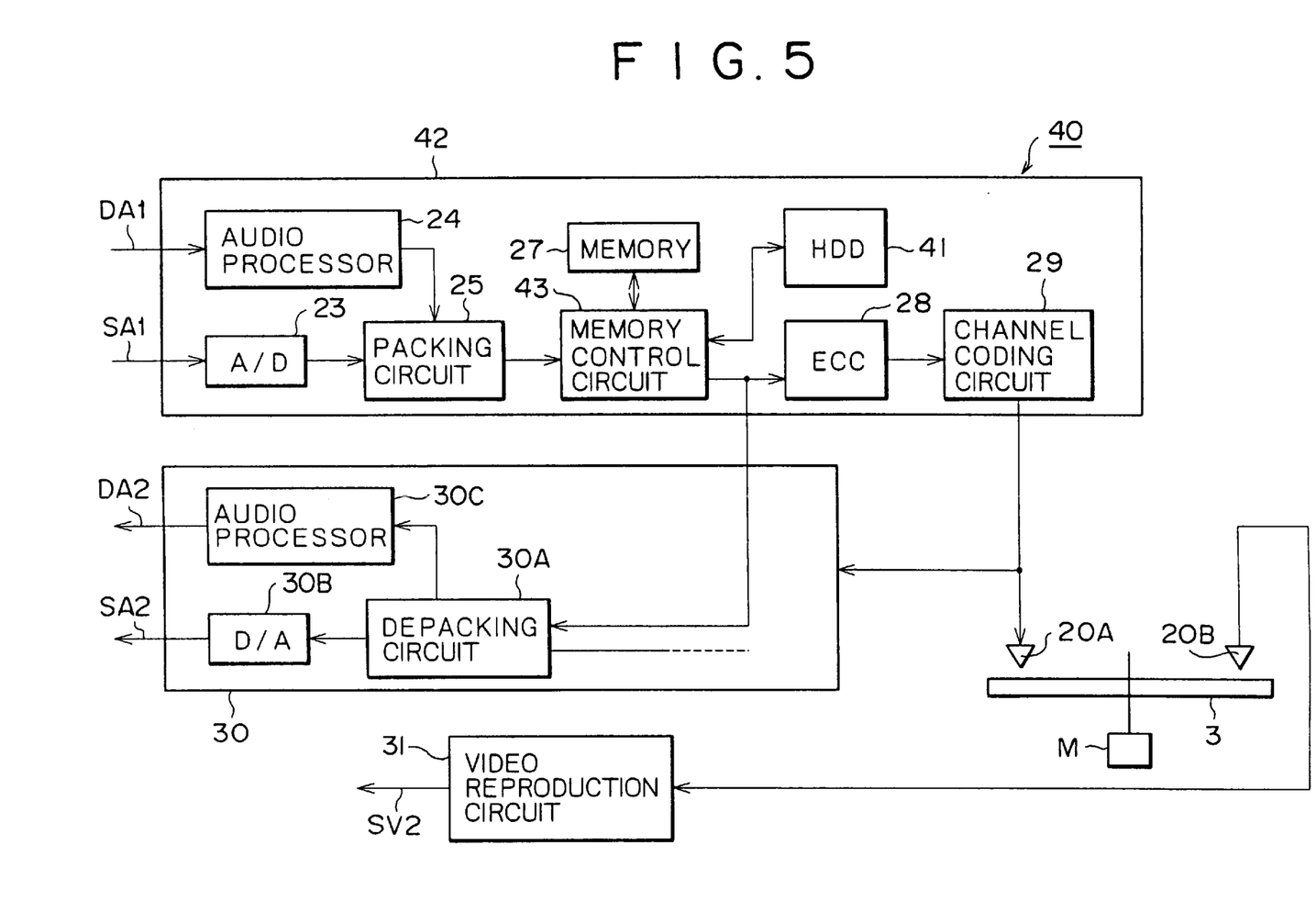
FIG. 5 is a block diagram showing another form of the viewer of the editing system of FIG. 2.

FIG. 5 shows a block diagram of a viewer which is applied to another editing system to which the present invention is applied. The editing system of the present embodiment is similar to but is different from the editing system 1 described hereinabove with reference to FIG. 1 only in the viewer of FIG. 5. Referring to FIG. 5, the viewer shown is generally denoted at 40 and is a modification to and is different from the viewer 4 shown in FIG. 4 in that it includes an audio recording circuit 42 in place of the audio recording circuit 22. The viewer 40 is generally constructed such that a hard disk apparatus (HDD) 41 is used to edit an audio signal for narration and thus edited audio signal is recorded onto the optical disk 3. It is to be noted that, in FIG.

5, the system control circuit 21 and the editing list 38 of the viewer 4 of FIG. 4 are omitted for simplified illustration. In FIG. 5, like configurations are identified by the same numerals in FIG. 4 and the explanation is omitted for simplification.

The audio recording circuit 42 is a modification to and is different from the audio recording circuit 22 shown in FIG. 4 in that it additionally includes the hard disk apparatus 41 as mentioned above and includes a memory control circuit 43 in place of the memory control circuit 26. The memory control circuit 43 in the audio recording circuit 42 temporarily stores, upon editing of narration, an audio signal stored in the memory 27 onto the hard disk apparatus 41 or updates the stored contents of the hard disk apparatus 41. Consequently, the viewer 40 can update the contents of narration recorded on the hard disk apparatus 41 when necessary. Further, upon preview of narration, the audio signal temporarily stored on the hard disk apparatus 41 is outputted to the audio reproduction circuit 30.

The memory control circuit 43 outputs, after contents of narration are settled, the audio signal temporarily stored on the hard disk apparatus 41 to the ECC circuit 28 in response to an operation of an operator so that the audio signal may be recorded onto the optical disk 3. In this instance, the memory control circuit 43 outputs the audio signal temporarily stored on the hard disk apparatus 41 to the ECC circuit 28 at a transfer rate corresponding to a real time of an audio signal of narration or at a high rate depending upon selection of the operator.

In the editing system of the present embodiment, the system control circuit not shown drives, upon after-voice over recording, an audio signal of narration is to be recorded onto the optical disk 3 at a transfer rate corresponding to a real time, the video reproduction circuit 31 in a similar manner as in the editing system of the first embodiment, and outputs a video signal SV2 of a corresponding result of editing. On the other hand, when the audio signal temporarily stored on the hard disk apparatus 41 is to be recorded onto the optical disk 3, operation of the video reproduction circuit 31 is controlled to stop.

The audio reproduction circuit 30 processes, upon preview of narration, the audio signal which is temporarily stored on the hard disk apparatus 41 inputted from the memory control circuit 43 in place of the audio signal obtained from the optical disk 3, and outputs thus processed audio signal. In particular, in the audio reproduction circuit 30, the audio signal is processed by a depacking circuit 30A so that it is restored to an original array, and the resulting audio signal is converted by a digital to analog conversion circuit 30B into an audio signal SA2 in the form of an analog signal, and outputted from the audio reproduction circuit 30. Otherwise, the audio signal outputted from the depacking circuit 30A is outputted as a digital audio signal DA2 through an audio processor 30C.

Consequently, the viewer 40 allows confirmation of narration recorded on the hard disk apparatus 41, and when necessary, the viewer 40 can update the stored contents of the hard disk apparatus 41 to modify the narration.

With the viewer 40 having the construction described above with reference to FIG. 5, narration can be recorded at a high rate onto the optical disk 3 by editing the same using the hard disk apparatus 41 and recording thus edited narration onto the optical disk 3. Incidentally, when an audio signal is recorded at a transfer rate corresponding to the real time, with the transfer rate of approximately 1.7 Mbps, if the audio signal is recorded at a high rate equal to the transfer rate of a video signal, then it can be recorded in a time approximately equal to one twentieth. Consequently, even if a corresponding video signal is not provided to the operator for a period of time for which an audio signal of narration is recorded onto the optical disk 3, the audio signal can be recorded in a sufficiently short time for practical use. Consequently, even if the narration data area ARN is not allocated to the inner circumference side of the optical disk 3, a similar effect to that of the first embodiment can be achieved.

Further, when necessary, the hard disk apparatus 41 can be used for some other processing of an audio signal to improve the convenience of use. Incidentally, for example, an audio signal which is used frequently in an editing operation can be recorded onto the hard disk apparatus to reduce the operation time.

3. Third Embodiment

Figure 6:
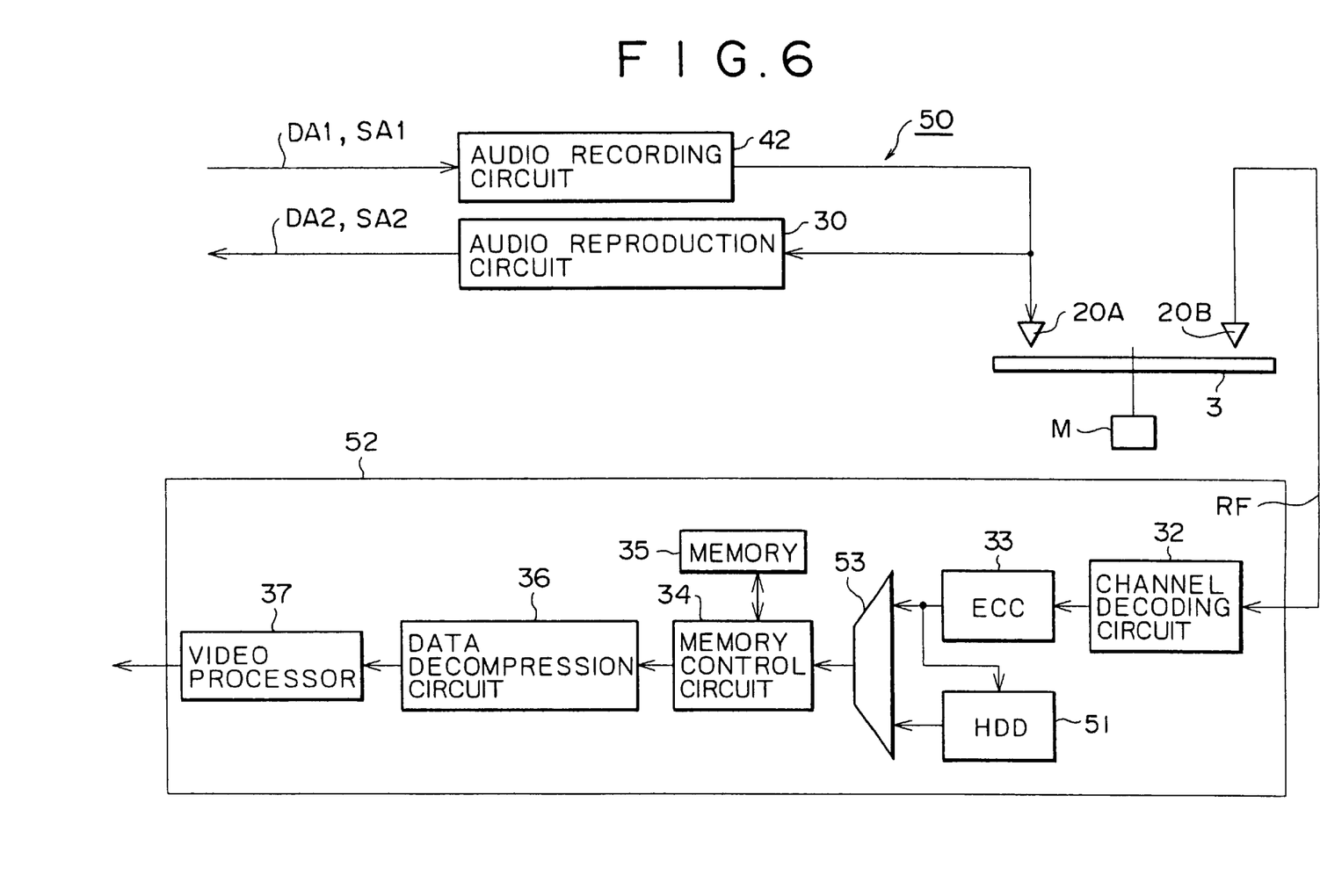
FIG. 6 is a block diagram showing a further form of the viewer of the editing system of FIG. 2.

FIG. 6 shows a block diagram of a viewer which is applied to a further editing system to which the present invention is applied. Referring to FIG. 6, the viewer is generally denoted at 50 and is a modification to and is different from the viewer 40 described hereinabove with reference to FIG. 5 in that it includes a video reproduction circuit 52 in place of the video reproduction circuit 31. The video reproduction circuit 52 is a modification to and is different from the video reproduction circuit 31 described hereinabove with reference to FIG. 4 in that it additionally includes a hard disk apparatus 51 and a selection circuit 53. Thus, the viewer 50 is generally constructed such that a video signal representative of a result of editing is temporarily stored onto the hard disk apparatus 51, and when necessary, the temporarily stored video signal is outputted in place of a video signal reproduced from the optical disk 3. In FIG. 6, like configurations are identified by the same numerals in FIGS. 4 and 5, and the explanation is omitted for simplification.

In particular, the hard disk apparatus 51 stores a video signal outputted from the ECC circuit 33 for a period of time for which an audio signal originating from narration is stored onto the hard disk apparatus 41 (refer to FIG. 5) of the audio recording circuit 42 upon after-voice over recording. Further, for a period of time for which the audio signal stored on the hard disk apparatus 41 of the audio recording circuit 42 is recorded onto the optical disk 3, the hard disk apparatus 51 outputs the stored video signal at a corresponding data transfer rate.

The selection circuit 53 outputs a video signal outputted from the ECC circuit 33 to the memory control circuit 34 for a period of time for which an audio signal of narration is recorded onto the hard disk apparatus 41 of the audio recording circuit 42 or during preview. Further, the selection circuit 53 outputs a video signal outputted from the hard disk apparatus 51 to the memory control circuit 34 for a period of time for which the audio signal stored on the hard disk apparatus 41 of the audio recording circuit 42 is recorded onto the optical disk 3.

Consequently, in the viewer 50, an audio signal originating from narration is stored onto the hard disk apparatus 41 of the audio recording circuit 42, and at a point of time when the contents of the narration are settled, a video signal corresponding to a result of editing is stored onto the hard disk apparatus 51. Further, thus stored contents are outputted at a transfer rate corresponding to an audio signal to be recorded onto the optical disk 3.

In the viewer 50 in the present embodiment, the audio reproduction circuit 30 outputs, under the control of the system control circuit, for a period of time for which an audio signal stored on the hard disk apparatus 41 is recorded onto the optical disk 3, a video signal stored on the hard disk apparatus 51 at a transfer rate corresponding to the transfer rate of the audio data.

With the viewer 50 having the construction described above with reference to FIG. 6, in addition to the construction of the viewer 40 in the second embodiment, since a video signal is temporarily stored onto the hard disk apparatus, when an audio signal originating from narration is to be recorded at a high rate onto the optical disk 3, contents of editing can be confirmed at a rate corresponding to the transfer rate. Consequently, operation can be performed without allowing an operator to get aware of the presence of the hard disk apparatus for narration. Accordingly, the editing system of the present embodiment exhibits a higher degree of convenience in use in addition to the effect achieved by the editing system of the second embodiment.

Further, when necessary, the hard disk apparatus 51 can be utilized for an editing operation of a video signal to improve the convenience in use. Incidentally, for example, the selection circuit 53 may be replaced by a mixer so that, in an editing operation for a special effect such as pre-reading editing, the hard disk apparatus 51 can be used as a buffer memory, and a special effect may be provided to a result of reproduction. Further, if a video signal which forms a title bar, a video signal to be used for superimposition, a video signal which is used frequently or the like are recorded onto and utilized with the hard disk apparatus, the operation time can be reduced.

4. Other Embodiments

While the editing systems of the second and third embodiments described above are constructed such that an area for narration is allocated to the inner circumference side in a user area, the present invention is not limited to this, and where an audio signal of narration is edited with a hard disk apparatus and recorded onto an optical disk, when necessary, the area for narration data may be allocated to some other places, or an audio signal of narration may be recorded in place of an audio signal of a particular channel.

Further, in the embodiments described above, recording areas for a video signal and recording areas for audio signals of different channels are successively formed concentrically, however, the present invention is not limited to this, and the allocation of a video signal and audio signals in a user area can be set in various manners in accordance with the necessity.

Further, in the embodiments described above, a video signal of one channel and audio signals of four channels are recorded onto an optical disk, however, the present invention is not limited to this and can be applied widely where a video signal and an audio signal are recorded with various numbers of channels.

Further, in the embodiments described above, a system data area is formed on the innermost circumference, however, the present invention is not limited to this and can be applied widely where a system data area is formed in any other area when necessary.

Further, in the embodiments described above, an optical disk is accessed by a pair of optical pickups for an audio signal and a video signal, however, the present invention is not limited to this, and for example, the present invention can be applied widely to such a case that two sets of optical disks for audio signals and video signals are disposed for the opposite faces of the optical disk so as to access the optical disk.

Further, in the embodiments described above, an optical disk is accessed by ZCLV, however, the present invention is not limited to this and can be applied widely to a case wherein an optical disk is driven in the condition of a fixed linear velocity to record a digital video signal or the like.

Further, in the second and third embodiments described above, an audio signal inputted to the ECC circuit 28 is temporarily stored onto a hard disk apparatus, however, the present invention is not limited to this, and an audio signal may be temporarily stored onto a hard disk apparatus on the input side of the memory control circuit 43 or on the output side of the ECC circuit 28.

Further, in the third embodiment described above, a video signal is temporarily stored onto a hard disk apparatus on the output side of the ECC circuit 28, however, the present invention is not limited to this, and when a sufficient capacity can be secured on a hard disk apparatus, a video signal may be temporarily stored onto the hard disk apparatus on the output side of the data decompression circuit 36, or several hard disk apparatus may be disposed at different places so that a video signal may be temporarily stored.

Further, in the embodiments described above, a digital video signal is compressed in accordance with the MPEG standards and recorded onto an optical disk, however, the present invention is not limited to this and can be applied widely also to such a case that various techniques are used to compress data to be recorded.

Further, in the embodiments described above, a digital video signal and a digital audio signal are recorded onto an optical disk of the phase change type which allows recording on both faces thereof, however, the present invention is not limited to this, and a magneto-optical disk which allows recording on both faces thereof or an optical disk of the write-once type may be used, or where a sufficient recording capacity can be secured, only one face may be used.

While preferred embodiments of the present invention have been described using specific terms, such description is for illustrative purpose only, and it is to be understood that changes and variations may be made without departing from the spirit or scope of the following claims.

What is claimed is:

1. An editing apparatus operable with a disk type recording medium, said apparatus comprising:
   an audio recording system for recording an auxiliary audio signal in an innermost circumference region of a recording area of said disk type recording medium, said auxiliary audio signal being associated with an edited video signal;
   a video reproduction system responsive to operation of said audio recording system for accessing the disk type recording medium to reproduce a video signal recorded in an outer circumference region of the disk type recording medium and to continuously output the reproduced video signal; and
   plural heads operable to record said auxiliary audio signal onto said disk type recording medium while simultaneously reproducing a video signal recorded on the same disk type recording medium.

2. An editing apparatus according to claim 1, wherein:
   said audio recording system includes audio signal storage means for temporarily storing the auxiliary audio signal, audio signal outputting means for outputting to external apparatus the auxiliary audio signal stored in said audio signal storage means, and audio signal recording means for recording onto the disk type recording medium the auxiliary audio signal stored in said audio signal storage means, and wherein said video reproduction system is selectively responsive to the temporary storing of the auxiliary audio signal in said audio signal storage means or the outputting of the auxiliary audio signal stored in said audio signal storage means for accessing the disk type recording medium to reproduce the video signal and continuously output the reproduced video signal.

3. An editing apparatus according to claim 2, wherein:
said video reproduction system includes video signal storage means for temporarily storing the reproduced video signal and video outputting means for outputting the video signal temporarily stored in said first video signal storage means at a rate corresponding to that of the auxiliary audio signal, selectively in response to the temporary storing of the auxiliary audio signal in said audio signal storage means, the outputting of the auxiliary audio signal stored in said audio signal storage means, or the recording onto the disk type recording medium of the auxiliary audio signal temporarily stored in said audio signal storage means.

4. An editing apparatus according to claim 3, wherein:
said video reproduction system includes second video signal storage means for temporarily storing the reproduced video signal, and the video outputting means being operable to output the video signal temporarily stored in the first or second video signal storage means at a rate corresponding to that of the auxiliary audio signal selectively in response to the temporary storing of the auxiliary audio signal in said audio signal storage means, the outputting of the auxiliary audio signal stored in said audio signal storage means, or the recording of the auxiliary audio signal temporarily stored in said audio signal storage means onto the disk type recording medium.

5. An editing apparatus according to claim 2, wherein:
the outer circumference region of the disk type recording medium is divided into a plurality of successive video signal and audio signal recording areas that are formed cyclically from an outer circumference side of the disk type recording medium toward an inner circumference side thereof.

6. An editing apparatus according to claim 2, including apparatus for receiving the disk type recording medium and means for recording a video signal and an audio signal into recording areas for the video signal and the audio signal.

7. An editing apparatus according to claim 3, wherein:
the outer circumference region of the disk type recording medium is divided into a plurality of successive video signal and audio signal recording areas that are formed cyclically from an outer circumference side of the disk type recording medium toward an inner circumference side thereof.

8. An editing apparatus according to claim 3, including apparatus for receiving the disk type recording medium and means for recording a video signal and an audio signal into recording areas for the video signal and the audio signal.

9. An editing apparatus according to claim 1, wherein:
the outer circumference region of the disk recording medium is divided into a plurality of successive video signal and audio signal recording areas that are formed cyclically from an outer circumference side of the disk type recording medium toward an inner circumference side thereof.

10. An editing apparatus according to claim 1, including apparatus for receiving the disk type recording medium and means for recording a video signal and an audio signal into recording areas for the video signal and the audio signal.

11. An editing apparatus operable with a disk type recording medium, said apparatus comprising:
an audio recording system for recording an auxiliary audio signal in a recording area of said disk type recording medium; and
a video reproduction system responsive to operation of said audio recording system for accessing the disk type recording medium to reproduce a video signal recorded in the disk type recording medium and continuously output the reproduced video signal,
said audio recording system including audio signal storage means for temporarily storing the auxiliary audio signal, audio signal outputting means for outputting to external apparatus the auxiliary audio signal stored in said audio signal storage means, and audio signal recording means for recording onto the disk type recording medium the auxiliary audio signal stored in said audio signal storage means,
whereby while said auxiliary audio signal is written to said storage means, a video signal recorded on the same disk type recording medium is simultaneously reproduced.

12. An editing apparatus according to claim 11, wherein:
said video reproduction system is selectively responsive to the temporary storing of the auxiliary audio signal in said audio signal storage means or the outputting of the auxiliary audio signal stored in said audio signal storage means for accessing the disk type recording medium to reproduce the video signal and continuously output the reproduced video signal.

13. An editing apparatus according to claim 12, wherein:
said video reproduction system includes video signal storage means for temporarily storing the reproduced video signal and video outputting means for outputting the video signal temporarily stored in said video signal storage means at a rate corresponding to that of the auxiliary audio signal, selectively in response to the temporary storing of the auxiliary audio signal in said audio signal storage means, the outputting of the auxiliary audio signal stored in said audio signal storage means, or the recording onto the disk type recording medium of the auxiliary audio signal temporarily stored in said audio signal storage means.

14. An editing apparatus according to claim 13, including apparatus for receiving the disk type recording medium and means for recording a video signal and an audio signal on the disk type recording medium.

15. An editing apparatus according to claim 12, including apparatus for receiving the disk type recording medium and means for recording a video signal and an audio signal on the disk type recording medium.

16. An editing apparatus according to claim 11, wherein:
said video reproduction system includes video signal storage means for temporarily storing the reproduced video signal and video outputting means for outputting the video signal temporarily stored in said video signal storage means at a rate corresponding to that of the auxiliary audio signal, selectively in response to the temporary storing of the auxiliary audio signal in said audio signal storage means, the outputting of the auxiliary audio signal stored in said audio signal storage means, or the recording onto the disk type recording medium of the auxiliary audio signal temporarily stored in said audio signal storage means.

17. An editing apparatus according to claim 16, including apparatus for receiving the disk type recording medium and means for recording a video signal and an audio signal on the disk type recording medium.

18. An editing apparatus according to claim 11, including apparatus for receiving the disk type recording medium and means for recording a video signal and an audio signal on the disk type recording medium.

19. An editing method for editing a disk type recording medium, comprising the steps of:

recording an auxiliary audio signal in an innermost circumference region of a recording area of said disk type recording medium; and accessing the disk type recording medium to reproduce a video signal recorded in an outer circumference region of the disk type recording medium and to continuously output the reproduced video signal, whereby while said auxiliary audio signal is recorded onto said disk type recording medium, a video signal recorded on the same disk type recording medium is simultaneously reproduced.

20. An editing method according to claim 19, wherein in said recording step, the disk type recording medium is driven to rotate at a constant linear velocity associated with said innermost circumference region.

21. An editing method according to claim 19, wherein in said accessing step, the disk type recording medium is driven to rotate at a constant angular velocity associated with said outer circumference region.

22. An editing method for editing a disk type recording medium, comprising the steps of:.

temporarily storing an auxiliary audio signal in audio signal storage means;

outputting to external apparatus the auxiliary audio signal stored in said audio signal storage means;

recording in a recording area of the disk type recording medium the auxiliary audio signal stored in said audio signal storage means; and accessing the disk type recording medium to reproduce a video signal recorded in the disk type recording medium and to continuously output the reproduced video signal, whereby while said auxiliary audio signal is written to said storage means, a video signal recorded on the same disk type recording medium is simultaneously reproduced.

23. An editing method according to claim 22, further comprising the steps of:

temporarily storing the reproduced video signal; and outputting the temporarily stored video signal at a rate corresponding either to that of the temporarily stored auxiliary audio signal or that of the auxiliary audio signal that is recorded.

* * * * *